United States Patent [19]

Moore et al.

[11] 4,198,465

[45] Apr. 15, 1980

[54] PHOTOCURABLE ACRYLIC COATED POLYCARBONATE ARTICLES

[75] Inventors: James E. Moore, Clifton Park; Ona V. Orkin; Siegfried H. Schroeter, both of Schenectady, all of N.Y.

[73] Assignee: General Electric Company, Pittsfield, Mass.

[21] Appl. No.: 956,872

[22] Filed: Nov. 1, 1978

[51] Int. Cl.² .................. C08F 2/50; B32B 27/30; B29D 11/00; B05D 3/06
[52] U.S. Cl. .................. 428/409; 204/159.16; 264/1; 264/85; 427/54.1; 427/164; 428/412; 428/522; 428/911; 428/918
[58] Field of Search ............. 428/412, 520, 409, 522, 428/911, 918; 427/54, 164, 160; 264/1, 85; 204/159.23, 159.16; 96/115 P

[56] References Cited

U.S. PATENT DOCUMENTS

| | | | |
|---|---|---|---|
| 3,331,761 | 7/1967 | Mao | 96/115 P |
| 3,465,076 | 9/1969 | Yokohama et al. | 264/255 |
| 3,518,341 | 6/1970 | Haryu | 264/265 |
| 3,582,398 | 6/1971 | Ringler | 428/412 |
| 3,661,685 | 5/1972 | Osteen | 428/412 X |
| 3,681,167 | 8/1972 | Moore | 428/412 X |
| 3,968,305 | 7/1976 | Oshima et al. | 428/334 |
| 3,968,309 | 7/1976 | Matsuo et al. | 428/409 |
| 3,978,178 | 8/1976 | Oshima et al. | 264/25 |
| 4,041,120 | 8/1977 | Oshima et al. | 264/171 |
| 4,082,891 | 4/1978 | Curry et al. | 428/412 |
| 4,107,391 | 8/1978 | Moore et al. | 428/412 X |
| 4,113,593 | 12/1978 | Barzynski et al. | 204/159.16 |
| 4,125,503 | 11/1978 | McCarty et al. | 204/159.16 X |
| 4,131,716 | 12/1978 | Bertozzi | 428/522 X |
| 4,135,007 | 1/1979 | Lorenz et al. | 428/522 X |

*Primary Examiner*—Harold Ansher
*Attorney, Agent, or Firm*—Myron B. Kapustij; William F. Mufatti

[57] ABSTRACT

A polycarbonate article having a durably adherent mar, abrasion and chemical resistant UV cured coating on the surface thereof comprised of the photoreaction products of (i) certain polyfunctional acrylate monomers and (ii) resorcinol monobenzoate.

32 Claims, No Drawings

PHOTOCURABLE ACRYLIC COATED POLYCARBONATE ARTICLES

This invention relates to polycarbonate articles coated with a photocured coating comprised of the photoreaction products of certain multifunctional acrylate ester monomers or mixtures thereof and resorcinol monobenzoate.

More particularly, this invention relates to a polycarbonate article having a photocured coating thereon which coating is mar, abrasion, and solvent resistant, has good adhesion to the polycarbonate substrate, and is compatible with the polycarbonate; i.e., does not adversely affect the polycarbonate substrate by stress cracking and crazing it, by causing crack propagation into the polycarbonate as a result of brittleness of the coating itself, and/or by adversely affecting the properties of the polycarbonate generally such as, for example, impact resistance, elongation, and tensile strength.

BACKGROUND OF THE INVENTION

Polycarbonates are commercially important materials possessing excellent physical and chemical properties which are useful in a wide range application from non-opaque impact resistance sheets to shaped articles. Generally, however, polycarbonates have rather low scratch resistance and are somewhat susceptible to attack by many common solvents and chemicals.

Previous efforts to overcome this low scratch resistance and susceptibility to attack by solvents have included lamination procedures and application onto the polycarbonate of a surface coating. Many of these prior art remedial efforts have been unsuccessful due to the incompatibility of the laminae and coating materials with the polycarbonate substrate. This incompatibility has resulted in stress cracking and crazing of the polycarbonate, crack propagation into the polycarbonate as a result of the brittleness of the coating, and a reduction of the advantageous properties of the polycarbonate such as, for example, impact resistance, tensile strength, non-opacity and elongation.

The prior art coatings for polycarbonates have included organopolysiloxanes, U.S. Pat. No. 3,707,397; polyester-melamines or acrylic-melamines, U.S. Pat. No. 3,843,390; and allyl resins, U.S. Pat. No. 2,332,461. These types of prior art coatings are generally applied from solutions of inert solvents and are cured to final properties by baking at elevated temperatures. The disadvantages of such systems are obvious. The heat curing requires a supply of thermal energy thereby adding to the cost of the system. Further, the thermal curing step is somewhat limited by the heat distortion temperature of the polycarbonate which is to be coated. Thus, in coating of polycarbonates, sheets of 30 mils and less generally cannot be coated and cured economically because of excessive warpage of the sheets during the thermal curing process.

U.S. Pat. No. 3,968,305 describes a synthetic shaped article having a mar-resistant polymer surface layer integrated with the polymer surface body, said polymer surface layer consisting essentially of, in polymerized form, (a) 20 to 100 weight percent of a compound having a total of at least three acryloxy and/or methacryloxy groups linked with a straight chain aliphatic hydrocarbon residue having not more than 20 carbon atoms, (b) 0 to 80 weight percent of at least one copolymerizable mono- or diethylenically unsaturated compound. This type of a surface layer suffers from the fact that it generally has poor durability of adhesion after prolonged exposure to weathering.

U.S. Pat. No. 3,968,309 describes a molded article of plastic having on its surface a cured film of a coating material comprising at least 30% by weight of at least one polyfunctional compound selected from the group consisting of polymethacryloxy compounds having a molecular weight of 250 to 800 and containing at least three methacryloyloxy groups in the molecule and polyacryloyloxy compounds having a molecular weight of 250 to 800 and containing at least three acryloyloxy groups in the molecule. This patent, however, also teaches that this coating must contain from 0.01 to 5% by weight of a fluorine-containing surfactant in order for the coated article to be acceptable. This patent teaches that when the coating material contains less than 0.01% by weight of the fluorine-containing surfactant, it is impossible to obtain a coated article having the requisite degree of surface hardness, surface smoothness, abrasion resistance and optical clarity. If the coating material contains more than 5% by weight of said fluorine-containing surfactant, the adhesion between a cured film of the coating material and a molded substrate of plastic is unsatisfactory.

It has now been found that a coating composition containing certain specific polyfunctional acrylic monomers in combination with resorcinol monobenzoate provides excellent and durable UV cured coatings for polycarbonate. Thus, the present invention provides certain acrylate ester monomer based UV-cured coatings for polycarbonates which adhere tenaciously and durably to the polycarbonate, are compatible with the polycarbonate, are mar, abrasion and solvent resistant, and maintain properties after prolonged exposure to weathering.

DESCRIPTION OF THE INVENTION

In accordance with the present invention, there is provided a non-opaque, more specifically, a transparent, polycarbonate article having deposited on the surface thereof an adherent, mar, abrasion and chemical resistant non-opaque coating, said coating containing the photoreaction products of at least one UV curable polyfunctional acrylate monomer, and resorcinol monobenzoate. The coating is obtained through the UV cure of a UV curable coating composition comprised of (i) at least one UV curable polyfunctional acrylate monomer, (ii) a photoinitiator, and (iii) resorcinol monobenzoate.

In the practice of this invention, any of the aromatic polycarbonates can be employed herein. These are homopolymers and copolymers and mixtures thereof that are prepared by reacting a dihydric phenol with a carbonate precursor. Typical of some of the dihydric phenols that may be employed in the practice of this invention are bisphenol-A (2,2-bis(4-hydroxyphenyl)propane), bis(4-hydroxyphenyl)methane, 2,2-bis(4-hydroxy-3-methylphenyl) propane, 3,3-bis(4-hydroxyphenyl)pentane, 2,2-bis(3,5-dichloro-4-hydroxyphenyl)-propane, 2,2-bis(4-3,5-dibromo-4-hydroxyphenyl) propane, bis(3-chloro-4-hydroxyphenyl) methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-I, para-tertiarybutyl-phenol, para-bromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptyl-ammonium iodide, tetra-n-propyl ammonium bromide, tetramethyl ammonium chloride, tetramethyl ammonium hydroxide, tetra-n-butyl-ammonium iodide, benzyltrimethylammonium chloride and quaternary phosphonium compounds such as, for example, n-butyltriphenyl phosphonium bromide and methyltriphenyl phosphonium bromide.

Also included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof.

Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also included herein are blends of a linear polycarbonate and a branched polycarbonate.

The polyfunctional acrylate ester monomers of the present invention are represented by the general formula

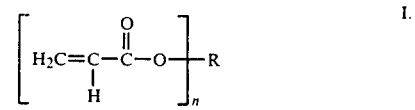

wherein n is an integer from 2 to 8, preferably from 2 to 6, and more preferably from 2 to 4; and R is a n functional hydrocarbon residue, a n functional substituted hydrocarbon residue, a n functional hydrocarbon residue containing at least one ether linkage, and a n functional substituted hydrocarbon residue containing at least one ether linkage.

Preferred n functional hydrocarbon residues are the n functional aliphatic, preferably saturated aliphatic, hydrocarbon residues containing from 1 to about 20 carbon atoms and the n functional aromatic hydrocarbon residues containing from 6 to about 10 carbon atoms.

Preferred n functional hydrocarbon residues containing at least one ether linkage are the n functional aliphatic hydrocarbon residues, preferably saturated aliphatic hydrocarbon residues, containing from 1 to about 5 ether linkages and from 2 to about 20 carbon atoms.

Preferred n functional substituted hydrocarbon residues are the n functional aliphatic hydrocarbon residues, preferably the saturated aliphatic hydrocarbon residues, containing from 1 to about 20 carbon atoms, and the n functional aromatic hydrocarbon residues containing from 6 to about 10 carbon atoms which contain substituent groups such as the halogens, i.e., fluorine, chlorine, bromine and iodine, hydroxyl, —COOH, and —COOR' groups wherein R' represents alkyl groups containing from 1 to about 6 carbon atoms.

Preferred n functional substituted hydrocarbon residues containing at least one ether linkage are the n functional aliphatic, preferably saturated aliphatic, hydrocarbon residues containing from 2 to about 20 carbon atoms and from 1 to about 5 ether linkages which contain substituent groups such as the halogen hydroxyl, —COOH, and —COOR' groups wherein R' is as defined above.

It is to be understood that where substituent groups are present, they should be such that they do not unduly hinder or interfere with the photocure of the polyfunctional acrylic monomers.

The more preferred polyfunctional acrylic monomers are those represented by formula I wherein R is selected from the group consisting of an n functional saturated aliphatic hydrocarbon residue containing from 1 to about 20 carbon atoms, a hydroxyl substituted n functional saturated aliphatic hydrocarbon residue containing from 1 to about 20 carbon atoms, an n functional saturated aliphatic hydrocarbon residue containing from 2 to about 20 carbon atoms and from 1 to about 5 ether linkages, and a hydroxyl substituted n functional saturated aliphatic hydrocarbon residue containing from 2 to about 20 carbon atoms and from 1 to about 5 ether linkages.

The preferred polyfunctional acrylate ester monomers are those wherein R is an n functional saturated aliphatic hydrocarbon, ether, or polyether radical, with those monomers wherein R is an n valent saturated aliphatic hydrocarbon radical being more preferred.

More particularly, the difunctional acrylic monomers, or diacrylates, are represented by formula I wherein n is 2; the trifunctional acrylic monomers, or triacrylates, are represented by formula I wherein n is 3; and the tetra-functional acrylic monomers, or tetraacrylates, are represented by formula I wherein n is 4.

Illustrative of suitable polyfunctional acrylate ester monomers of formula I are those listed below in TABLE I.

TABLE I

Diacrylates of Formula I

1. $CH_2=CHCOO-CH_2-OOCCH=CH_2$
2. $CH=CHCOO-CH_2-CH_2-OOCCH=CH_2$
3. $CH_2=CHCOO-CH_2-CHOHCH_2-OOCCH=CH_2$
4. $CH_2=CHCOO-(CH_2)_6-OOCCH=CH_2$
5. $CH_2=CHCOO-CH_2-CH_2-\underset{\underset{OOCCH=CH_2}{|}}{CH}-CH_3$
6. $CH_2=CHCOO-CH_2CH_2OCH_2CH_2-OOCCH=CH_2$
7. $CH_2=CHCOO-CH_2CH_2OCH_2CH_2OCH_2CH_2OCH_2CH_2-OOCCH=CH_2$
8. $CH_2=CHCOO-CH_2-\underset{\underset{CH_3}{|}}{\overset{\overset{CH_3}{|}}{C}}-OOCCH=CH_2$
9. $CH_2=CHCOO-CH_2-\underset{\underset{CH_3}{|}}{\overset{\overset{CH_2Br}{|}}{C}}-OOCCH=CH_2$
10. $CH_2=CHCOO-CH_2-\underset{\underset{CH_3}{|}}{\overset{\overset{CH_2OH}{|}}{C}}-OOCCH=CH_2$
11. $CH_2=CHCOO-CH_2-\underset{\underset{CH_2OH}{|}}{\overset{\overset{CH_2OH}{|}}{C}}-OOCCH=CH_2$
12. $CH_2=CHCOO-CH_2-\underset{\underset{CH_2Br}{|}}{\overset{\overset{CH_2OH}{|}}{C}}-OOCCH=CH_2$
13. $CH_2=CHCOO-CH_2-CH=CH-CH_2-CH_2-OOCCH=CH_2$
14. $CH_2=CHCOO-CH_2-CH=CH-\underset{\underset{CH_2OH}{|}}{CH}-OOCH=CH_2$
15. $CH_2=CHCOO-CH_2-\underset{\underset{CH_2Cl}{|}}{\overset{\overset{CH_2OH}{|}}{C}}-CH_2OOCCH=CH_2$
16. $CH_2=CHCOO-CH_2-\underset{\underset{}{}}{\overset{\overset{OCH_3}{|}}{CH}}-CH_2-OOCCH=CH_2$ 17. $CH_2=CHCOO-\text{C}_6\text{H}_4-OOCCH=CH_2$ (para-phenylene)

18. $CH_2=CHCOO-\text{C}_6\text{H}_3(CH_3)-OOCCH=CH_2$ (methyl-substituted phenylene)

19. $CH_2=CHCOO-\text{C}_6\text{H}_3(Br)-OOCCH=CH_2$ (bromo-substituted phenylene)

TABLE I-continued

20.
$$CH_2=CHCOO-\underset{OH}{\underset{|}{\bigcirc}}-OOCCH=CH_2$$

21.
$$CH_2=CHCOO-CH_2CHCH_2-OOCCH=CH_2$$
$$\underset{|}{\overset{|}{C_6H_5}}$$

Triacrylates of Formula I

22.
$$\overset{OOCCH=CH_2}{\underset{|}{CH_2=CHCOO-CH_2CH_2CH_2CH-OOCCH=CH_2}}$$

23.
$$CH_2=CHCOO-CH_2$$
$$CH_2=CHCOO-CH_2-\underset{|}{\overset{|}{C}}-CH_2=CH_2$$
$$CH_2=CHCOO-CH_2$$

24.
$$CH_2OH$$
$$CH_2=CHCOO-CH_2-\underset{|}{\overset{|}{C}}-CH_2-OOCCH=CH_2$$
$$CH_2-OOCCH=CH_2$$

25.
$$CH_2=CHCOO-\underset{}{\overset{OOCCH=CH_2}{\bigcirc}}-OOCCH=CH_2$$

Tetraacrylates of Formula I

26.
$$CH_2=CHCOO-CH_2$$
$$CH_2=CHCOO-CH_2-\underset{|}{\overset{|}{CH}}-CH_2-OOCCH=CH_2$$
$$CH_2=CHCOO-CH_2$$

27.
$$CH_2=CHCOO-CH_2-CH-CH-CH_2-OOCCH=CH_2$$
$$\underset{|}{\overset{|}{CH_2=CHOO-CH_2}} \quad \underset{|}{\overset{|}{CH_2-OOCCH=CH_2}}$$

28.
$$\overset{OH}{\underset{|}{CH_2=CHCOO-CH_2CHCH-CH_2CH-OOCCH=CH_2}}$$
$$\underset{|}{\overset{|}{CH_2=CHCOO-CH_2}} \quad \underset{|}{\overset{|}{CH_2-OOCCH=CH_2}}$$

These polyacrylate esters and their production are well known to those skilled in the art. One method of producing the di-, tri-, and tetraacrylate esters involves reacting acrylic acid with a di-, tri-, or tetrahydroxyl compound to produce the diester, triester or tetraester. Thus, for example, acrylic acid can be reacted with ethylene glycol to produce ethylene glycol diacrylate (compound 2 in Table I).

Although the coating compositions may contain only one of said polyfunctional acrylate monomers, preferred coating compositions contain a mixture of two polyfunctional monomers, preferably a diacrylate and a triacrylate. When the coating compositions contain a mixture of acrylate monomers, it is preferred that the ratio, by weight, of the diacrylate to the triacrylate be from about 30/70 to about 70/30. Exemplary mixtures of diacrylates and triacrylates include mixtures of hexanediol diacrylate with pentaerythritol triacrylate, hexanediol diacrylate with trimethylolpropane triacrylate, diethyleneglycol diacrylate with pentaerythritol triacrylate, and diethyleneglycol diacrylate with trimethylolpropane triacrylate.

While the corresponding coatings may likewise contain the ultraviolet light reaction product of a single polyfunctional acrylate monomer, coatings containing the photoreaction product of two polyfunctional acrylate monomers, preferably a diacrylate and a triacrylate, are preferred.

Generally, the coating composition contains from about 70 to about 99 weight percent of the polyfunctional acrylate or acrylates. The UV cured coating contains from about 70 to about 99 weight percent of the photoreaction products of the polyfunctional acrylate monomer or mixture of acrylate monomers present in the coating composition.

The photocurable coating compositions also contain a photosensitizing amount of photosensitizer, i.e., an amount effective to effect the photocure of the coating composition. Generally, this amount is from about 0.01% to about 10% by weight, preferably from about 0.1% to about 5% by weight of the photocurable coating composition. These additives and the cure thereof are generally well known in the art. Some nonlimiting examples of these UV radiation photosensitizers include ketones, such as benzophenone, acetophenone, benzil benzyl methyl ketone; benzoins and substituted benzoins such as benzoin methyl ether, α-hydroxymethyl benzoin isopropyl ether; halogen containing compounds such as α-bromoacetophenone, p-bromoacetophenone, α-chloromethylnaphthalene; and the like.

The coating compositions of the instant invention also contain resorcinol monobenzoate. The resorcinol monobenzoate is present in an amount, based upon the weight of the coating composition, exclusive of any additional solvent which may optionally be present, of from about 1 to about 20 weight percent, preferably from about 3 to about 15 weight percent. The UV cured coating contains from about 1 to about 20% by weight of the photoreaction products of resorcinol monobenzoate, which products are formed during the UV cure of the UV curable coating composition.

The coating compositions of the instant invention may also optionally contain various flatting agents, surface active agents, thixotropic agents, UV light absorbers and dyes. All of these additives and the use thereof are well known in the art and do not require extensive discussions. Therefore, only a limited number will be referred to, it being understood that any compounds possessing the ability to function in such a manner, i.e., as a flatting agent, surface active agent, UV light absorber, and the like, can be used so long as they do not deleteriously affect the photocuring of the coating compositions and do not adversely affect the non-opaque character of the coating.

The various surface-active agents, including anionic, cationic and nonionic surface-active agents are described in Kirk-Othmer Encyclopedia of Chemical Technology, Vol. 19, Interscience Publishers, New York, 1969, pp. 507-593, and Encyclopedia of Polymer Science and Technology, Vol. 13, Interscience Publishers, New York, 1970, pp. 477-486, both of which are references and incorporated herein.

In the practice of the present invention, the photocurable coating compositions are first compounded by adding together the polyfunctional acrylic monomer or mixtures thereof, the UV photosensitizer, resorcinol monobenzoate, and, optionally, any of the other aforementioned additives. Additionally, if so desired to reduce the viscosity of the coating formulation, an organic solvent, such as an alcohol, may optionally be incorporated into the formulation. Generally, the amount of solvent, if any, present should be such that evaporation of the solvent occurs before any deleterious effect on the substrate due to the aggressiveness (in the chemical etching sense) of the coating composition develops. The various components are thoroughly mixed so as to form a generally homogeneous coating composition. A thin, uniform coating of the coating solution is then applied onto the polycarbonate surface by any of the known means such as dipping, spraying, rollcoating and the like. The coating is then cured in an inert, e.g., nitrogen, atmosphere, by UV irradiation which can have a wavelength of from 1849 A. to 4000 A. The lamp systems used to generate such radiation can consist of ultraviolet lamps which can consist of discharge lamps, as for example, xenon, metallic halide, metallic arc, such as low or high pressure mercury vapor discharge lamp, etc., having operating pressures of from as low as a few milli-torr up to about 10 atmospheres, can be employed. By curing is meant both polymerization of the polyfunctional acrylic monomers and cross-linking of the polymers to form hard, non-tacky coatings.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein.

EXAMPLE 1

An aromatic polycarbonate is prepared by reacting 2,2-bis(4-hydroxyphenyl) propane and phosgene in the presence of an acid acceptor and a molecular weight regulator and having an intrinsic viscosity of 0.57. The product is then fed to an extruder, which extruder is operated at about 265° C. and the extrudate is comminuted into pellets.

The pellets are then injection molded at about 315° C. into test panels of about 4 in. by 4 in. by about 1/8 in. thick. The test panels are subjected to an abrasion test, Gardner Impact test and an adhesion test.

The abrasion test is one wherein test panels hving a ¼ inch diameter hole cut in the center are subjected to a Taber Abraser. The Taber Abraser is equipped with CS-10F wheels which are resurfaced every 200 cycles by abrading for 25 cycles on a S-111 refacing disc. The weights used in combination with the CS-10F wheels are 500 gm. weights. Initial measurements of % Haze are made at four places around the future wear track of the sample using a Gardner Hazemeter. The sample is abraded for 100 cycles, cleaned with isopropanol, and the % Haze is remeasured at the same four places. The four differences in % Haze are calculated and averaged to give the % Haze. The Δ% Haze of this uncoated sample is 34.0.

Examples 2-9 demonstrate that the sole use of monofunctional acrylate monomers in the coating composition does not provide suitable coatings.

EXAMPLE 2

A coating composition is made by blending together 100 parts by weight of hydroxyethyl acrylate, 2 parts by weight of α,α-diethoxyacetophenone, and 0.5 parts by weight of a silicone oil type surface active agent produced by Mallincrodt Chemical Co. of New Jersey under the designation BYK-300. A film of about 0.3 mils thickness of this coating composition is applied to one side of a polycarbonate panel produced in accordance with Example I using a wire-wound drawdown bar. The coated polycarbonate panel is then passed through a Linde photocuring apparatus (this consists of a variable speed conveyor running through a chamber containing germicidal type mercury vapor lamps which emit light mainly at 2537 A°, 3150 A°, and 3605 A° operated in air) wherein the nitrogen pressure is 25 psi nitrogen and the speed of the conveyor is 50 ft/min. Two passes through this system results in a coating which is tacky and undercured.

EXAMPLE 3

A coating composition is made by blending together 100 parts by weight of hydroxypropyl acrylate, 2 parts by weight of α,α-diethoxyacetophenone, and 0.5 parts by weight of a surface active agent produced by Mallincrodt Chemical Co. under the designation BYK-300. A film of about 0.3 mils thickness is applied to a polycarbonate panel produced in accordance with Example I using a wire-wound drawdown bar. The film is then passed twice through the Linde apparatus as in Example II. The result is a tacky, undercured coating.

EXAMPLE 4

A coating composition is made by blending together 100 parts by weight of 2-ethoxyethyl acrylate, 2 parts by weight of α,α-diethoxyacetophenone, and 0.5 parts of BYK-300. A film of about 0.3 mils thickness is applied to a polycarbonate panel produced in accordance with Example I using a wire-wound drawdown bar. The film is passed twice through the Linde apparatus as in Example II. The resulting coating is tacky and undercured.

EXAMPLE 5

A coating composition is prepared by blending together 100 parts by weight of 2-ethylhexyl acrylate, 2 parts by weight of α,α-diethoxyacetophenone, and 0.5 parts of BYK-300. A film of about 0.3 mils thickness is applied to a polycarbonate panel produced in accordance with Example I using a wire-wound drawdown bar. The film is passed twice through the Linde apparatus as in Example II. The resulting coating is tacky and undercured.

EXAMPLE 6

A coating composition is prepared by blending together 100 parts by weight of 1,3-butanediol dimethylacrylate, 2 parts by weight of α,α-diethoxyacetophenone, and 0.5 parts of BYK-300. A film of about 0.3 mils thickness is applied to a polycarbonate panel produced in accordance with Example I using a wire-wound drawdown bar. The film is passed twice through the Linde apparatus as in Example II. The resulting coating is tacky and undercured.

EXAMPLE 7

A coating composition is prepared by blending together 100 parts by weight of tetraethyleneglycol dimethacrylate, 2 parts by weight of α,α-diethoxyacetophenone, and 0.5 parts of BYK-300. A film of about 0.3 mils thickness is applied to a polycarbonate panel produced in accordance with Example 1 using a wire-wound drawdown bar. The film is passed twice through the Linde apparatus as in Example II. The resulting coating is tacky and undercured.

EXAMPLE 8

A coating composition is prepared by blending together 100 parts by weight of hydroxyethyl methacrylate, 2 parts by weight of α,α-diethoxyacetophenone, and 0.5 parts of BYK-300. A film of about 0.3 mils thickness is applied to a polycarbonate panel produced in accordance with Example 1 using a wire-wound drawdown bar. The film is passed twice through the Linde apparatus as in Example 2. The resulting coating is tacky and undercured.

EXAMPLE 9

A coating composition is prepared by blending together 100 parts by weight of allyldiglycol carbonate, 2 parts by weight of α,α-diethoxyacetophenone, and 0.5 parts of BYK-300. A film of about 0.3 mils thickness is applied to a polycarbonate panel produced in accordance with Example 1 using a wire-wound drawdown bar. The film is passed twice through the Linde apparatus as in Example 2. The resulting coating is tacky and undercured.

The following is an example of a polyfunctional methacrylate ester monomer based coating which fails to adhere properly to the polycarbonate substrate.

EXAMPLE 10

A coating composition is prepared by blending together 100 parts by weight of trimethylolpropane trimethacrylate, 2 parts by weight of α,α-diethoxyacetophenone, and 0.5 parts of BYK-300. A film of about 0.3 mils thickness of this coating composition is applied to one side of a polycarbonate panel produced in accordance with Example 1 using a wire-wound drawdown bar. The coated polycarbonate panel is then passed twice through a Linde apparatus as in Example 2. The resulting coating is hard and tack-free. The coated polycarbonate is then subjected to the abrasion test, Gardner Impact Test and the adhesion test. The Δ% haze of this sample is 6.0. The sample passes the Gardner Impact Test but fails the scribed adhesion test.

The following are examples of photocured polyfunctional acrylate ester monomer and resorcinol monobenzoate containing coatings of the present invention.

EXAMPLE 11

A coating composition is prepared by blending together 50 parts by weight of diethyleneglycol diacrylate, 50 parts by weight of pentaerythritol triacrylate, 2 parts by weight of α,α-diethoxyacetophenone, 5 parts by weight of resorcinol monobenzoate, and 0.5 parts of BYK-300. A film of about 0.3 mils thickness of this coating composition is applied to polycarbonate panels produced in accordance with Example 1 using a wire-wound drawdown bar. The coated polycarbonate panels are passed twice through the Linde apparatus as in Example 2. The resulting coating is hard and tack-free. The coated polycarbonate panels are then subjected to weathering and the weathered samples are subjected to the abrasion test as in Example 1, to a Gardner Impact Test, by impacting the uncoated side of the polycarbonate panel with a force of 320 inch lbs., to a Yellowness Index Test as set forth in ASTM D-1925-70, to the scribed adhesion test. The scribed adhesion test consists of using a multiple blade tool to cut parallel grooves through the coating into the substrate, the sample is then rotated 90° and the cutting process is repeated. This leaves a grid pattern of 1 mm squares cut into the coating. An adhesive tape is applied over the cross-hatched area and quickly pulled off. A sample fails the adhesion test if any of the squares are pulled off. Weathering of the coated sample comprises exposing the coated samples in a 6 kilowatt Xenon arc Weather-O-Meter ® manufactured by Atlas Electric Devices Co. for a predetermined period. The results of the adhesion test, Gardner Impact Test, and abrasion test are set forth in TABLE II.

EXAMPLE 12

A coating composition is prepared by blending together 50 parts by weight of hexanediol diacrylate, 50 parts by weight of trimethylolpropane triacrylate, 2 parts by weight of α,α-diethoxyacetophenone, 5 parts by weight of resorcinol monobenzoate, and 0.5 parts of BYK-300. A film of about 0.3 mils thickness of this coating composition is applied to one side of polycarbonate panels produced in accordance with Example 22 using a wire-wound drawdown bar. The coated polycarbonate panels are then passed twice through a photocure apparatus as in Example 2. The resulting coating is hard and tack-free. The coated polycarbonate panels are exposed to weathering as in Example 11 and the weathered samples are then subjected to the abrasion test, Gardner Impact Test, the scribed adhesion test, and the Yellowness Index Test, and the results are set forth in TABLE II.

EXAMPLE 13

A coating composition is prepared by blending together 50 parts by weight of diethyleneglycol diacrylate, 50 parts by weight of trimethylol propane triacrylate, 2 parts by weight of $\alpha,\alpha$-diethoxyacetophenone, 10 parts by weight of resorcinol monobenzoate, and 0.5 parts of BYK-300. A film of about 0.3 mils thickness of this coating composition is applied to one side of polycarbonate panels produced in accordance with Example 1 using a wire-wound drawdown bar. The coated polycarbonate panels are then passed twice through a photocure apparatus as in Example 2. The resulting coating is hard and tack-free. These coated polycarbonate panels are then exposed on an outdoor rock facing south inclined at an angle of 45°. After one year, the panels are removed and subjected to the scribed adhesion test. The results of this test are set forth in TABLE III.

EXAMPLE 14

A coating composition is prepared by blending together 50 parts by weight of hexanediol diacrylate, 50 parts by weight of trimethylolpropane triacrylate, 2 parts by weight of $\alpha,\alpha$-diethoxyacetophenone, 10 parts by weight of resorcinol monobenzoate, and 0.5 parts of BYK-300. A film of about 0.3 mils thickness of this coating composition is applied to one side of polycarbonate panels produced in accordance with Example 1 using a wire-wound drawdown bar. The coated polycarbonate panels are then passed twice through a Linde apparatus as in Example 2. The resulting coating is hard and tack-free. The coated polycarbonate panels are then exposed on an outdoor rock facing south inclined at an angle of 45°. After one year, the panels are removed and subjected to the scribed adhesion test. The results of this test are set forth in TABLE III.

EXAMPLE 15

A coating composition is prepared by blending together 100 parts by weight of diethyleneglycol diacrylate, 2 parts by weight of $\alpha,\alpha$-diethoxyacetophenone, 10 parts by weight of resorcinol monobenzoate and 0.5 parts of BYK-300. A film of about 0.3 mils thickness of this coating composition is applied to one side of polycarbonate panels produced in accordance with Example 1 using a wire-wound drawdown bar. The coated polycarbonate panels are then passed twice through a Linde apparatus as in Example 2. The resulting coating is hard and tack-free. The coated polycarbonate panels are then subjected to the scribed adhesion test, both before and after 160 hours exposure to an RS sunlamp, and the results are set forth in TABLE IV.

EXAMPLE 16

A coating composition is prepared by blending together 50 parts by weight of hexanediol diacrylate, 50 parts by weight of trimethylolpropane triacrylate, 2 parts by weight of $\alpha,\alpha$-diethoxyacetophenone, 10 parts by weight of resorcinol monobenzoate, and 0.5 parts of BYK-300. A film of about 0.3 mils thickness of this coating composition is applied to one side of polycarbonate panels produced in accordance with Example 1 using a wire-wound drawdown bar. The coated polycarbonate panels are then passed twice through a Linde apparatus as in Example 2. The resulting coating is hard and tack-free. The coated polycarbonate panels are then subjected to the adhesion test and the results are set forth in TABLE V.

The following examples describe embodiments falling outside the scope of the present invention and demonstrate that the coatings produced thereby are inferior to the coatings of the instant invention.

EXAMPLE 17

A coating composition is prepared by blending together 50 parts by weight of trimethylolpropane triacrylate, 50 parts by weight of hexanediol diacrylate, 2 parts by weight of $\alpha,\alpha$-diethoxyacetophenone, and 0.5 parts of BYK-300. A film of about 0.3 mils thickness of this coating composition is applied to one side of polycarbonate panels produced in accordance with Example 1 using a wire-wound drawdown bar. The coated polycarbonate panels are then passed twice through a Linde apparatus as in Example 2. The coated panels are exposed to weathering as in Example 11 and the weathered panels are then subjected to the abrasion test, Gardner Impact Test, the scribed adhesion test and the Yellowness Index Test, and the results are set forth in TABLE II.

EXAMPLE 18

A coating composition is prepared by blending together 50 parts by weight of pentaerythritol triacrylate, 50 parts by weight of diethyleneglycol diacrylate, 2 parts by weight of $\alpha,\alpha$-diethoxyacetophenone, and 0.5 parts of BYK-300. A film of about 0.3 mils thickness of this coating composition is applied to one side of polycarbonate panels produced in accordance with Example 1 using a wire-wound drawdown bar. The coated polycarbonate panels are then passed twice through a Linde apparatus as in Example 2. The coated polycarbonate panels are exposed to weathering as in Example 11 and the weathered panels are then subjected to the abrasion test, Gardner Impact Test, the scribed adhesion test and the Yellowness Index Test, and the results are set forth in TABLE II.

EXAMPLE 19

A coating composition is prepared by blending together 50 parts by weight of trimethylolpropane triacrylate, 50 parts by weight of hexanediol diacrylate, 2 parts by weight of $\alpha,\alpha$-diethoxyacetophenone, and 0.5 parts of BYK-300. A film of about 0.3 mils thickness of this coating composition is applied to one side of polycarbonate panels produced in accordance with Example 1 using a wire-wound drawdown bar. The coated polycarbonate panels are then passed twice through a Linde apparatus as in Example 2. The coated polycarbonate panels are then exposed on an outdoor rock facing south inclined at an angle of 45°. After one year, the panels are removed and subjected to the scribed adhesion test. The results of this test are set forth in TABLE III.

EXAMPLE 20

A coating composition is prepared by blending together 100 parts by weight of diethyleneglycol diacrylate, 2 parts by weight of $\alpha,\alpha$-diethoxyacetophenone, and 0.5 parts of BYK-300. A film of about 0.3 mils thickness of this coating composition is applied to one side of polycarbonate panels produced in accordance with Example 1 using a wire-wound drawdown bar. The coated polycarbonate panels are then passed twice through a Linde apparatus as in Example 2. The coated polycarbonate panels are subjected to the scribed adhesion test, both before and after 160 hours exposure to an RS sunlamp, and the results are set forth in TABLE IV.

EXAMPLE 21

A coated composition is prepared substantially in accordance with Example 16 except that 2,2',4,4'-tetrahydroxy benzophenone is substituted for resorcinol monobenzoate. Polycarbonate panels are coated substantially as in Example 16 and are subjected to the scribed adhesion test and the results are set forth in TABLE V.

EXAMPLE 22

A coating composition is prepared substantially in accordance with Example 16 except that 2 hydroxy-4-octyloxy benzophenone is substituted for resorcinol monobenzoate. Polycarbonate panels are coated substantially as in Example 16 and are subjected to the scribed adhesion test and the results are set forth in TABLE V.

TABLE II (Performance after 1500 hours exposure to Xenon Arc Weather-O-Meter ®)

|  | Sample 11 | Sample 12 | Sample 17 | Sample 18 |
|---|---|---|---|---|
| Visual appearance | Smooth surface | Smooth surface | Smooth surface | Smooth surface |
| Scribed adhesion test | Pass | Pass | Fail | Fail |
| Abrasion Test (Δ % H) |  |  |  |  |
| 100 cycles | 1.5 | 1.2 | 0.5 | 1.3 |
| 300 cycles | 4.8 | 3.2 | 2.4 | (a) |
| Δ YI | −1.3 | −1.1 | +1.1 | +0.8 |
| 320 in.-lb. Gardner Falling Dart Impact (after 750 hours of exposure to Weather-O-Meter ®) | Pass | Pass | Fail | Crack |
| 320 in.-lb. Gardner Falling Dart Impact (after 1500 hours exposure to Weather-O-Meter ®) | Pass | Crack | Fail | Fail |

(a) Coating chipped from surface during test.

Examples 11, 12, 17 and 18 and TABLE II demonstrate that coatings containing photocured polyfunctional acrylates, but no resorcinol monobenzoate, have inferior durability of adhesion after exposure to weathering, i.e., these coatings fail the adhesion test after exposure to weathering, as compared to the coatings of the instant invention, which contain both the photocured polyfunctional acrylates and resorcinol monobenzoate, which coatings retain their adhesion after exposure to weathering. These examples and TABLE II also demonstrate that polycarbonate articles coated with the aforedescribed coatings containing no resorcinol monobenzoate have, after exposure to weathering, inferior impact resistance as compared to polycarbonate articles coated with similar coatings which do contain resircinol monobenzoate. These examples and TABLE II further illustrate that not only do the coatings of the instant invention have good durability and do not degrade the properties of the polycarbonate, but they also act to protect the polycarbonate substrate from yellowing caused by ultraviolet light.

TABLE III

| Sample | 300 Cycle Abrasion Test - % Haze |
|---|---|
| Example 13 | 6.5 |
| Example 14 | 8.2 |
| Example 19 | Coating peeled off during exposure |

Examples 13, 14 and 19 and TABLE III further demonstrate the superior durability of the coatings of the instant invention as compared to similar coatings containing no resorcinol monobenzoate under actual weathering conditions.

These examples and TABLE III not only demonstrate that the coatings of the instant invention retain their adhesion after a one-year exposure to the elements while similar coatings that do not contain resorcinol monobenzoate lose their adhesion after such exposure, but they further demonstrate that the coatings of the instant invention retain their mar abrasion properties after this prolonged exposure to the elements.

TABLE IV

| Sample | Scribed Adhesion Test (before exposure to RS sunlamp) | Scribed Adhesion Test (after 160 hours exposure to RS sunlamp |
|---|---|---|
| Example 15 | Pass | Pass |
| Example 20 | Pass | Fail |

Examples 15 and 20 and TABLE IV demonstrate that while coatings based on photocured polyfunctional acrylates, but which contain no resorcinol monobenzoate, have good initial adhesion to polycarbonate substrates, this adhesion deteriorates to an unacceptable level upon exposure to ultraviolet light. The coatings of the instant invention, on the other hand, have both good initial adhesion and good adhesion after exposure to ultraviolet light.

TABLE V

| Sample | Scribed Adhesion Test |
|---|---|
| Example 16 | Pass |
| Example 21 | Fail |
| Example 22 | Fail |

Examples 16 and 21-22, and TABLE V demonstrate that, substituting other commonly known and available ultraviolet light screening compounds for resorcinol monobenzoate results in UV-cured polyfunctional acrylate coatings having unacceptable properties.

As can be seen from the foregoing examples and TABLE II-V, it is the particular combination of polyfunctional acrylates and resorcinol monobenzoate which provides coatings which possess the requisite properties, i.e., optical clarity, abrasion resistance, adhesion, durability of adhesion, non-degradation of the properties of the substrate polycarbonate, and protection of the polycarbonate against the deleterious effects of ultraviolet light.

One particularly useful application of a shaped non-opaque polycarbonate article coated with the coating of the instant invention is as a lens in vehicular headlamps.

Although specific embodiments of the invention have been described, it should not be limited to the particular compositions and articles described herein, but is intended to include all modifications that may be made which, pursuant to the patent statutes and laws, do not depart from the spirit and scope of the invention.

What is claimed is:

1. A shaped article having improved abrasion resistance comprising a polycarbonate substrate coated with an ultraviolet light curable coating composition consisting essentially of:
   (i) a photoinitiator;
   (ii) at least one ultraviolet light curable cross-linkable polyfunctional acrylate monomer represented by the general formula

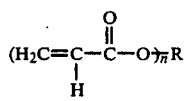

wherein n is an integer having a value of from 2 to 4, and R is selected from the group consisting of a n valent aliphatic hydrocarbon residue, n valent substituted aliphatic hydrocarbon residue, n valent aliphatic hydrocarbon residue containing at least one other linkage, and n valent substituted aliphatic hydrocarbon residue containing at least one ether linkage; and (iii) resorcinol monobenzoate.

2. The article of claim 1 wherein said coating composition contains an amount of a photoinitiator effective to initiate the photocure of said ultraviolet light curable polyfunctional acrylate monomer upon exposure to ultraviolet light.

3. The article of claim 2 wherein said n valent aliphatic hydrocarbon residue and n valent substituted aliphatic hydrocarbon residue contain from 1 to about 20 carbon atoms.

4. The article of claim 2 wherein said n valent aliphatic hydrocarbon residue containing at least one ether linkage and n valent substituted aliphatic hydrocarbon residue containing at least one ether linkage contain from 2 to about 20 carbon atoms.

5. The article of claim 4 wherein said n valent aliphatic hydrocarbon residue containing at least one ether linkage and n valent substituted aliphatic hydrocarbon residue containing at least one ether linkage contain from 1 to 5 ether linkages.

6. The article of claim 3 wherein said acrylate monomer is diethyleneglycol diacrylate.

7. The article of claim 1 wherein said coating composition contains a mixture of hexanediol diacrylate and trimethylolpropane triacrylate monomer.

8. The article of claim 1 wherein said coating composition contains a mixture of hexanediol diacrylate and pentaerythritol triacrylate monomers.

9. The article of claim 1 wherein said coating composition contains a mixture of diethyleneglycol diacrylate and pentaerythritol triacrylate monomers.

10. A shaped article having improved abrasion resistance comprising a polycarbonate substrate coated with an ultraviolet light cured thermoset coating consisting essentially of the photoreaction products of:
    (i) at least one polyfunctional acrylate monomer represented by the general formula

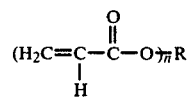

wherein n is an integer having a value of from 2 to 4, and R is selected from the group consisting of a n valent aliphatic hydrocarbon residue, n valent substituted aliphatic hydrocarbon residue, n valent aliphatic hydrocarbon residue containing at least one ether linkage, and n valent substituted aliphatic hydrocarbon residue containing at least one ether linkage; and (ii) resorcinol monobenzoate.

11. The article of claim 10 wherein said n valent aliphatic hydrocarbon residue and n valent substituted aliphatic hydrocarbon residue contain from 1 to about 20 carbon atoms.

12. The article of claim 10 wherein said n valent aliphatic hydrocarbon residue containing at least one ether linkage and n valent substituted aliphatic hydrocarbon residue containing at least one ether linkage contain from 2 to about 20 carbon atoms.

13. The article of claim 12 wherein said n valent aliphatic hydrocarbon residue containing at least one ether linkage and n valent substituted aliphatic hydrocarbon residue containing at least one ether linkage contain from 1 to 5 ether linkages.

14. The article of claim 11 wherein said acrylate monomer is diethyleneglycol diacrylate.

15. The article of claim 10 wherein said coating contains the photoreaction products of a mixture of hexanediol diacrylate and trimethylolpropane triacrylate monomers.

16. The article of claim 10 wherein said coating contains the photoreaction products of a mixture of hexanediol diacrylate and pentaerythritol triacrylate monomers.

17. The article of claim 10 wherein said coating contains the photoreaction products of a mixture of diethyleneglycol diacrylate and pentaerythritol triacrylate monomers.

18. The article of claim 10 wherein said article is a lens for a vehicular headlamp.

19. A method for providing a mar resistant tenaciously and durably adhered hard coating onto the surface of a solid substrate comprising:
    (i) applying a thin layer of a coating composition onto the surface of said solid substrate, said coating composition consisting essentially of (a) at least one polyfunctional acrylate monomer represented by the general formula

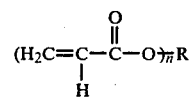

wherein n is an integer having a value of from 2 to 4, and R is selected from the group consisting of a n valent aliphatic hydrocarbon residue, a n valent substituted aliphatic hydrocarbon residue, a n valent aliphatic hydrocarbon residue containing at least one ether linkage, and a n valent substituted aliphatic hydrocarbon residue containing at least one ether linkage, (b) a photoinitiator, and (c) resorcinol monobenzoate; and (ii) exposing said coated substrate under an inert atmosphere to ultraviolet light for a period of time sufficient to polymerize and crosslink said polyfunctional acrylate monomers, thereby forming said hard coating.

20. The process of claim 19 wherein said inert atmosphere is nitrogen atmosphere.

21. The article of claim 1 wherein said coating composition further contains an ultraviolet light absorbent compound.

22. The article of claim 10 wherein said coating further contains an ultraviolet light absorbent compound.

23. The process of claim 19 wherein said coating composition further contains an ultraviolet light absorbent compound.

24. The article of claim 3 wherein said n valent aliphatic hydrocarbon residue is a n valent saturated aliphatic hydrocarbon residue and wherein said n valent substituted aliphatic hydrocarbon residue is a n valent substituted saturated aliphatic hydrocarbon residue.

25. The article of claim 24 wherein said n valent substituted saturated aliphatic hydrocarbon residue is a n valent hydroxyl substituted saturated aliphatic hydrocarbon residue.

26. The article of claim 5 wherein said n valent aliphatic hydrocarbon residue containing from 1 to 5 ether linkages is a n valent saturated aliphatic hydrocarbon residue containing from 1 to 5 ether linkages and wherein said n valent substituted aliphatic hydrocarbon residue containing from 1 to 5 ether linkages is a n valent substituted saturated aliphatic hydrocarbon residue containing from 1 to 5 ether linkages.

27. The article of claim 26 wherein said n valent substituted saturated aliphatic hydrocarbon residue containing from 1 to 5 ether linkages is a n valent hydroxyl substituted saturated aliphatic hydrocarbon residue containing from 1 to 5 ether linkages.

28. The article of claim 11 wherein said n valent aliphatic hydrocarbon residue is a n valent saturated aliphatic hydrocarbon residue and wherein said n valent substituted aliphatic hydrocarbon residue is a n valent substituted saturated aliphatic hydrocarbon residue.

29. The article of claim 28 wherein said n valent substituted saturated aliphatic hydrocarbon residue is a n valent hydroxyl substituted saturated aliphatic hydrocarbon residue.

30. The article of claim 13 wherein said n valent aliphatic hydrocarbon residue containing from 1 to 5 ether linkages is a n valent saturated aliphatic hydrocarbon residue containing from 1 to 5 ether linkages and wherein said n valent substituted aliphatic hydrocarbon residue containing from 1 to 5 ether linkages is a n valent substituted saturated aliphatic hydrocarbon residue containing from 1 to 5 ether linkages.

31. The article of claim 30 wherein said n valent substituted saturated aliphatic hydrocarbon residue containing 1 to 5 ether linkages is a n valent hydroxyl substituted saturated aliphatic hydrocarbon residue containing from 1 to 5 ether linkages.

32. The process of claim 19 wherein said solid substrate is polycarbonate.

* * * * *